US00RE34555E

United States Patent [19]

Hanaway

[11] E Patent Number: Re. 34,555

[45] Reissued Date of Patent: Mar. 1, 1994

[54] GUIDE SLEEVE, GUIDE POST AND IMPROVED BALL BEARING ASSEMBLY

[76] Inventor: Ronald L. Hanaway, 30210 E. Eight Mile Rd., Farmington Hills, Mich. 48236

[21] Appl. No.: 931,876

[22] Filed: Aug. 18, 1992

Related U.S. Patent Documents

Reissue of:

[64] Patent No.: 5,096,307
Issued: Mar. 17, 1992
Appl. No.: 644,532
Filed: Jan. 23, 1991

[51] Int. Cl.[5] ..... F16C 29/04

[52] U.S. Cl. ..... 384/49; 384/30; 384/906

[58] Field of Search ..... 384/49, 30, 906, 50, 384/528

[56] References Cited

U.S. PATENT DOCUMENTS 3,434,760 3/1969 Wendler ..... 384/30
3,752,540 8/1973 Bosworth ..... 384/30
4,648,727 3/1987 O'Neil et al. ..... 384/49
4,664,534 5/1987 Hanaway ..... 384/49
5,054,937 10/1991 Hanaway ..... 384/49

*Primary Examiner*—Lenard A. Footland
*Attorney, Agent, or Firm*—Dykema Gossett

[57] ABSTRACT

In combination, a guide post having a longitudinal slot and a ball bearing cage adjustably receiving the post and adapted for relative longitudinal and rotary movements, there being an internal annular open top recess in the cage inwardly of one end. A truncated roller bearing with opposed hemispherical surfaces and opposed flat sides in guidably positioned within the slot with the roller bearing maintaining a rolling point contact with the bottom wall of the slot and with the roller flat sides loosely and slidably registerable with the side walls of the slot. A hemispherical surface of the roller bearing being positioned and retained within an internal annular recess within the ball cage. An end cap with a shank is threaded into the cage, with the shank terminating in an annular open bottom recess cooperatively receiving said roller bearing from trapping the roller bearing in the cage.

10 Claims, 1 Drawing Sheet

GUIDE SLEEVE, GUIDE POST AND IMPROVED BALL BEARING ASSEMBLY

Matter enclosed in heavy brackets [ ] appears in the original patent but forms no part of this reissue specification; matter printed in italics indicates the additions made by reissue.

*CONTINUITY DATA*

*This is a reissue of Ser. No. 07/644,532 filed Jan. 23, 1991, U.S. Pat. No. 5,096,307.*

FIELD OF INVENTION

The present invention relates to a guide sleeve, guide post and bearing assembly for maintaining an alignment of a pair of parallel plates during relative reciprocal movements and wherein upper and lower die shoes may be mounted upon said plates.

BACKGROUND OF THE INVENTION

In the guide sleeve, guide post and bearing assembly of U.S. Pat. No. 4,664,534 dated May 12, 1987, of Applicant's Assignee, one disadvantage was that at times portions of the set screw 51 for trapping the roller 41 within the annular recess 43 of the ball cage 35 had a limited mechanical interference with the adjacent roller 41 as it rolled along guide slot 33.

Further in seeking an entry of the roller 41, FIG. 7, of that Patent, into the interior of the ball cage 35 for entry into the recess 43 there were difficulties in broaching the exterior corners 53 to the radial opening when inserting the roller 41, and the subsequent threading of the bore 49 for insertion of the set screw 51 into the ball retainer or cage so as to trap the roller within the cage recess 43.

Further difficulties were involved in the engineering of a special type of roller 41 with rounded corners at 47, FIG. 6, such as would permit its insertion radially into the bore 49 and ultimately into the recess 43 to prevent any binding of portions of the roller 41 with respect to the cage during relative rotary movements of the cage with respect to the roller as constrained against rotation within the slot 33 of the post 29.

SUMMARY OF THE INVENTION

An important feature of the present invention is to eliminate any machining of the ball cage in connection with the insertion and anchoring of a roller bearing within the annular recess therein.

An important feature is to provide in combination a guide post having a longitudinal axis and a longitudinal slot substantially throughout its length having a bottom wall and opposed side walls and a cylindrical ball bearing cage having a coaxial longitudinal axis adjustably receiving the post adapted for relative longitudinal and rotary movements thereon and with the cage having an internal annular open top recess. A truncated roller bearing having opposed hemispherical surfaces and additionally opposed flatened sides is guidably positioned within the guide post slot. The roller maintains a rolling point contact with the bottom wall of the slot and the roller flat sides are loosely and slidably registerable with the side walls of the slot during relative longitudinal movements of the ball cage with respect to the post and an end cap is threaded into said cage and includes an annular open bottom recess. The truncated roller is slidably nested within said annular recesses.

As another feature, the roller is alternately registerable with opposite ends of the longitudinal slot limiting rectilinear movement of the ball cage relative to the guide post.

As another feature, one of the hemispherical portions of the roller is positioned within the annular cage and cap recesses. The cage is adapted for rotary sliding movement relative to said roller in a direction at right angles to the longitudinal axis of the guide post.

As still another feature, said end cap traps the roller within the guide slot and within the internal annular recesses within the ball cage and the cap.

These and other features and objects will be seen from the following specification and claims in conjunction with the appended drawing.

THE DRAWINGS

It will be understood that the above drawing illustrates merely a preferred embodiment of the invention, and that other embodiments are contemplated within the scope of the claims hereafter set forth.

DETAILED DESCRIPTION OF AN EMBODIMENT OF THE INVENTION

Figure 1:
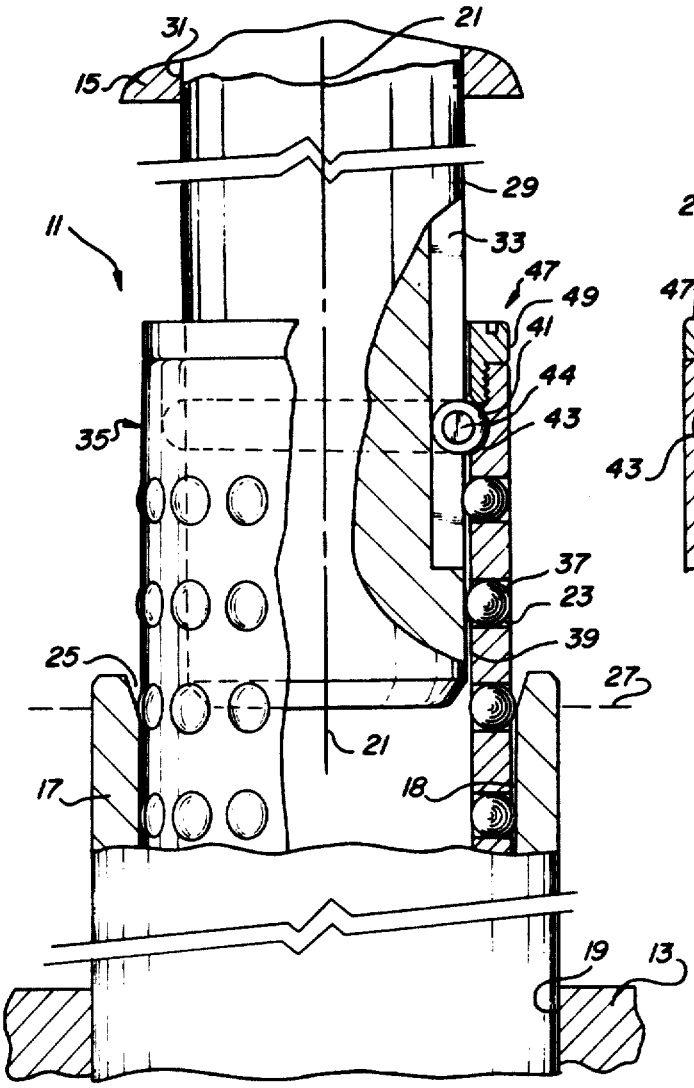
FIG. 1 is a fragmentary partly broken away and sectioned elevational view of the present guide sleeve, guide post and modified bearing assembly as used in conjunction with a pair of relatively movable upper and lower die shoes, fragmentarily shown.

Referring to the drawing, FIG. 1, the illustrative die set with guide sleeve, guide post and improved bearing assembly is generally indicated at 11, and includes lower die shoe 13, fragmentarily shown. Overlying the lower die shoe is an upper die shoe 15, fragmentarily shown, it is adapted for vertical reciprocal movements with respect to lower die shoe 13 and with respect to a die set mounted upon the corresponding die shoes in a conventional manner, not shown.

The present guide post, guide sleeve and bearing assembly includes the open ending guide sleeve 17, fragmentarily shown, having a cylindrical bore 18 and press fitted in an upright position within a corresponding aperture 19 in the lower die shoe 13.

Sleeve 17 has a central longitudinal axis 21 and is adapted to receive a corresponding guide post 29 having a similar longitudinal axis 21. The upper end of guide post 29, fragmentarily shown, is press fitted within aperture 31 within upper die shoe 15.

An elongated guide slot 33, is fragmentarily shown, formed along substantially the length of post 29 on its exterior. A second guide slot 33 may be formed upon the opposite side of said post if desired. The cylindrical ball cage 35 or ball bearing retainer, in the illustrative embodiment includes a series of longitudinally spaced circles of apertures 23 within which are positioned and entrapped or loosely retained a corresponding plurality of spaced ball bearings 37. These are arranged in longitudinally spaced circles so as to uniformly project through the body of the ball cage exteriorly and interiorly thereof, FIG. 1.

Within the ball bearing retainer 35 adjacent its bore 39 there is provided an internal annular open top recess 43 inwardly of one end thereof which receives truncated roller bearing 41. An opposed portion of the truncated bearing 41 guidably projects into post slot 33. Said recess has a cross-sectional shape that is concave and portends an arc greater than 45 degrees up to about 70 degrees.

Figure 2:
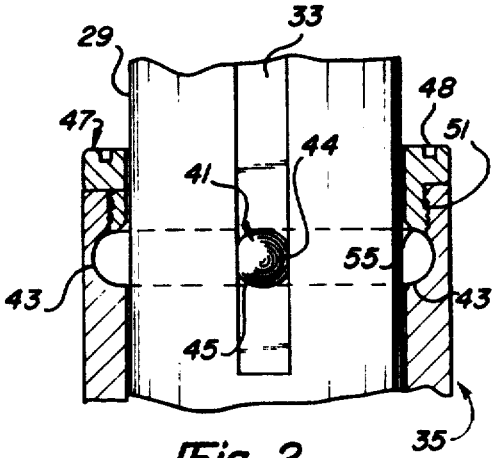
FIG. 2 is a fragmentary right side elevational view thereof with the ball bearing cage partly broken away and sectioned.
Figure 3:
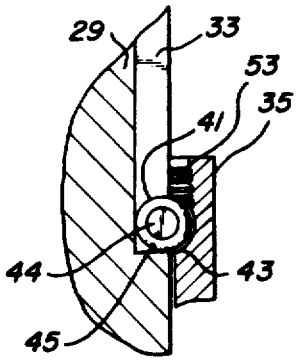
FIG. 3 is a fragmentary sectional view corresponding to the upper portion of FIG. 1 with the cap removed and with the roller at one end of the guide post for disassembly.

The present engineered truncated roller 41 has a pair of opposed machined flat surfaces 44, FIG. 2, and a pair of opposed hemispherical surfaces 45.

Recess 43 terminates in an interiorly threaded counter bore 53 extending to the end of ball cage 35. Apertured end cap 47 has a top flange 47 with spanner apertures 48 and includes a depending threaded shank 51. Said shank is threaded into counter bore 53 and includes at its end an annular open bottom recess or bevel 55. The cap recess 55 has a cross-sectional shape less than 45 degrees, i.e. of about 20 degrees, approximately. The cage recess 43 and the cap recess 55 cooperate to provide with the cage an annular composite recess to cooperatively receive the hemispherical portions 45 of roller bearing 41.

In operation the present sleeve 17, post 29 and bearing assembly 35 are interposed with respect to the upper and lower die shoes 15 and 13, respectively. Slot 33 within the guide post 29 cooperatively receives the truncated roller bearing 41 limiting relative longitudinal movements of the ball bearing cage 35 along the length of post 29.

Said roller bearing is positioned within slot 33 which has a bottom wall and a pair of opposed side walls. Said roller bearing hemispherical portion 45 maintains a rolling point contact with the bottom wall of slot 33. At the same time the roller opposed flat sides 44 loosely and slidably register with the opposed side walls of slot 33.

During conventional reciprocal movements of the guide post 29 with respect to sleeve 17 and with the ball cage 35 mounted upon the guide post and interposed between the post and sleeve 17, longitudinal reciprocal movement of the post effects corresponding longitudinal movements of ball cage 35 with respect to sleeve 17.

While the truncated roller 41 is trapped within slot 33, ball cage 35 is not restrained against rotation with respect to guide post 29 and guide sleeve 17 and is therefore capable of relative rotary movements with respect to both the guide post 29 and sleeve 17. The ball cage is free for such relative rotary movements with respect to the post and sleeve when the post and sleeve are disengaged so that there is no preload. By providing a ball cage which is free for relative rotation, all tracking of the balls 37 in the cage with respect to the post and sleeve is eliminated and friction is minimized. After each separation there is an opportunity for relative rotation.

In the illustrative embodiment bore 18 of sleeve 17 is slightly over size with respect to the maximum diameter of the ball bearing assembly 35, so that it is free to enter the sleeve 17 during the down stroke. The upper end of sleeve 17 is tapered outwardly as at 25 and transversely of said sleeve there is schematically shown a preload line 27. There is an oversize relation of the ball bearing assembly after the cage and guide post has lowered into the sleeve of about 0.001 inches with respect to the sleeve 17. Thus there is a preload of the balls with respect to said sleeve and guide post 29. There is a slight expansion of the sleeve as the post and cage enter the sleeve. At the same time the cage begins to roll up the post.

As an improvement and simplification over the disclosure of U.S. Pat. No. 4,664,534 there is provided the present improved and engineered truncated roller 41, FIGS. 1–4.

As viewed in FIGS. 1–4, in operation the truncated roller 41 has an instantaneous point of contact upon one side with the bottom wall of the post slot 33 as the roller 41 moves along the length of slot 33 during relative reciprocal movements of guide post 29 with respect to sleeve 17. This reduces friction to a minimum with such instantaneous point contact of one of the hemispherical opposed portions 45 of the roller in engagement with the bottom wall of slot 33. At the same time, the opposed flatened walls 44 of the truncated roller are arranged adjacent to and move along the opposed side walls of the correspondence longitudinal slot 33.

For assembly or disassembly of ball cage 35 with respect to guide post 21, the guide post 29 first is separated from bushing 17, or axially elevated therefrom. To disassemble the ball cage cap 47 is unthreaded and removed, or elevated as in FIG. 4.

Figure 4:
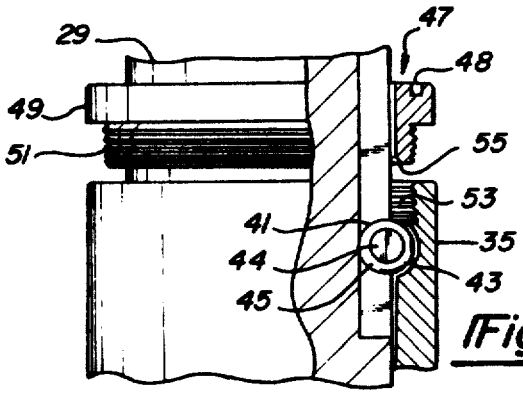
FIG. 4 is a fragmentary sectioned view of a part of FIG. 1, with the cap unthreaded.

This can be accomplished by manually sliding the ball cage 35 downwardly off of post 27, FIG. 4.

For reassembly with the loose cap 47 and the ball cage reassembled over guide post 29, the roller bearing 41 is slidably positioned into guide post slot 33 below unthreaded cap 47. Roller bearing 41 is free to enter the recess 43 in ball bearing cage 35. Cap 47 is then threaded into counter bore 53 of said cage, FIG. 4.

The truncated roller 41 is now trapped within the longitudinal groove 33 and within the annular recess 43 and 55.

Having described my invention, reference should now be had to the following claims:

I claim:

1. In combination, a guide post having a longitudinal axis and a longitudinal slot substantially throughout its length and having end portions;

a cylindrical ball bearing cage having a co-axial longitudinal bore adjustably receiving said guide post, and adapted for relative longitudinal and rotary movements thereon;

said ball bearing cage mounting a plurality of spaced circularly arranged ball bearings extending substantially the length of said cage and projecting inwardly and outwardly thereof, respectively, there being an internal open top annular recess in said cage spaced inwardly of one end thereof, and terminating in a threaded counter bore extending to said one end;

a truncated roller bearing having opposed hemispherical surfaces and opposed flat sides, guidably positioned within said longitudinal slot with a hemispherical surface maintaining a rolling point contact with the bottom of said slot and said flat sides loosely and slidably registerable with opposed sides of said slot;

said roller being alternately registerable with opposite end portions of said slot, limiting rectilinear movements of the ball cage relative to said guide post;

a hemispherical portion of said roller being positioned within the cage annular recess;

an end cap having a depending shank threaded into said counter bore;

there being an internal annual open bottom recess upon the end of said shank cooperatively receiving a hemispherical portion of said roller; and said cage including its recess and cap recess being adapted for rotary sliding movement relative to said roller in a direction at right angles to said axis, said cap trapping said roller within said ball cage.

2. In the combination of claim 1, further comprising said open top annular recess having an arcuate cross section of about 45 degrees, said annular open bottom cap recess having an arcuate cross section of about 45 degrees, said recess cooperatively receiving said truncated roller bearing.

3. The combination defined in claim 2, further comprising said open top recess being greater than 45 degrees and said open bottom cap recess being than 45 degrees.

4. In the combination of claim 2, further comprising said open bottom recess being tapered downwardly and outwardly and having a cross section of about 20 degrees.

5. In the combination defined in claim 1, further comprising a guide sleeve having a coaxial longitudinal axis, with said ball cage and guide post projected into said sleeve for relative longitudinal movements and for rotary movements of said cage relative to said sleeve.

6. The combination of claim 1, further comprising a top annular flange upon said end cap overlying and tightly engaging said ball cage.

7. In the combination defined in claim 6, further comprising said guide post and sleeve being upright and at their ends projected into and respectively secured within the upper and lower relatively movable die shoes of a die set assembly.

8. In the combination defined in claim 6, further comprising said top flange having the same diameter as and merging with said cage as a continuation thereof.

9. In the combination of claim 1, further comprising a pair of diametrically opposed spanner apertures in the top of said cap, to facilitate unthreading thereof.

*10. In combination, a guide post having a longitudinal axis and a longitudinal slot substantially throughout its length and having end portions;*

*a cylindrical ball bearing cage having a co-axial longitudinal bore adjustably receiving said guide post, and adapted for relative longitudinal and rotary movements thereon;*

*said ball bearing cage mounting a plurality of spaced circularly arranged ball bearings extending substantially the length of said cage and projecting inwardly and outwardly thereof, respectively, there being an internal open top annular recess in said cage spaced inwardly of one end thereof, and terminating in a threaded counter bore extending to said one end;*

*a key positioned within said longitudinal slot, said key being alternately registerable with opposite ends of said slot, limiting rectilinear movements of said ball cage relative to said guide post, a portion of said key being positioned within said cage annular recess;*

*an end cap having a depending shank threaded into said counter bore;*

*there being an internal annual open bottom recess upon the end of said shank cooperatively receiving a portion of said key; and*

*said cage including its recess and cap recess being adapted for rotary sliding movement relative to said key in a direction at right angles to said axis, said cap trapping said key within said ball cage.*

* * * * *